United States Patent [19]

Cruickshank

[11] Patent Number: 5,099,115
[45] Date of Patent: Mar. 24, 1992

[54] TUBULAR MEMBERS INSPECTION APPARATUS HAVING AN INSPECTION WINDOW AND MEANS FOR CORRELLATING REFLECTED LIGHT TO WINDOW DAMAGE

[75] Inventor: John S. Cruickshank, Perthshire, Scotland

[73] Assignee: Universal Vision Company, Hazelwood, Mo.

[21] Appl. No.: 546,096

[22] Filed: Jun. 27, 1990

[30] Foreign Application Priority Data

Jun. 29, 1989 [GB] United Kingdom ............... 8914960

[51] Int. Cl.$^5$ ............................................. H01J 5/16
[52] U.S. Cl. .................................... 250/236; 356/241
[58] Field of Search .............. 250/235, 236, 341, 372; 356/241; 324/221; 346/33

[56] References Cited

U.S. PATENT DOCUMENTS

| | | |
|---|---|---|
| 2,313,310 | 3/1943 | Arnold .......................... 346/33 WL |
| 3,017,855 | 1/1962 | Ranker . |
| 3,034,729 | 5/1962 | Gray et al. . |
| 3,037,228 | 6/1962 | Cummings . |
| 3,039,428 | 6/1962 | McLean . |
| 3,106,491 | 10/1963 | Leibner . |
| 3,245,824 | 4/1966 | Treat et al. . |
| 3,543,144 | 11/1970 | Walters et al. ...................... 324/221 |
| 3,703,947 | 11/1972 | Landrum . |
| 3,878,811 | 4/1975 | Rombach . |
| 3,886,893 | 6/1975 | Takeuchi . |
| 3,960,644 | 6/1976 | McFadden . |
| 4,036,173 | 7/1977 | Nicklas . |
| 4,058,258 | 11/1977 | Rossen et al. . |
| 4,085,894 | 4/1978 | Kubo et al. . |
| 4,092,950 | 6/1978 | Hart . |
| 4,096,300 | 6/1978 | Williams et al. . |
| 4,178,875 | 12/1979 | Moschetti . |
| 4,218,989 | 8/1980 | Fujita et al. . |
| 4,249,475 | 2/1981 | Lindsey . |
| 4,308,824 | 1/1982 | Muta et al. . |
| 4,369,713 | 1/1983 | Richardson . |
| 4,371,569 | 2/1983 | Muta . |
| 4,800,104 | 1/1989 | Cruickshank . |
| 4,957,112 | 9/1990 | Yokoi et al. ............................ 128/4 |
| 4,967,092 | 10/1990 | Fraignier et al. ................. 356/241 |

Primary Examiner—David C. Nelms
Assistant Examiner—Que T. Le
Attorney, Agent, or Firm—Ladas & Parry

[57] ABSTRACT

An inspection apparatus for internally inspecting tubular members has a body having an inspection window. Located inside the body is a camera, a laser and associated reflectives, one of the reflectives being rotatable by a motor such that a beam of light is directed through the window to illuminate an axial extending strip of the entire 360° interior circumference of the tubular member. Light is reflected from the window and the tubular member to be focussed onto the camera lens. The images reflected by the window and the tubular member interior surface are correlated so that, for example, ovality of the tubular member may be detected. The data may also be compared with data stored in a computer.

14 Claims, 4 Drawing Sheets

TUBULAR MEMBERS INSPECTION APPARATUS HAVING AN INSPECTION WINDOW AND MEANS FOR CORRELLATING REFLECTED LIGHT TO WINDOW DAMAGE

BACKGROUND OF THE INVENTION a) Field of the Invention

This invention relates to inspection apparatus for internally inspecting tubular members and is particularly intended for the inspection of tubular members in the field of energy exploration.

b) Description of Related Art

In U.S. Pat. No. 4,800,104 there is disclosed an inspection apparatus for determining damage such as ovality or corrosion caused to the internal surface of tubular members, especially when the tubular members are located downhole, although the U.S.A. patent also discloses apparatus for the external inspection of tubular members prior to the insertion of the members downhole.

The apparatus disclosed in the U.S.A. patent requires a body within which is located a pair of lasers which project a beam, via a number of reflectives through a window within the body to project a 360° strip of radiant energy onto the interior surface of the tubular member which, upon reflection through the window, is collected and analysed to determine defects on the tubular member interior surface.

The apparatus disclosed in the aforesaid U.S.A. patent is suitable for tubular members having an internal diameter of 30 inches (76 cm) or more and because two lasers are required the power requirements are significant.

It is a first object of this invention to provide an inspection apparatus which may be used in smaller diameter tubular members and in which the power requirements of the apparatus are reduced.

SUMMARY OF THE INVENTION

According to this invention there is provided an inspection apparatus for the internal inspection of tubular members including a body having an inspection window, said body being adapted for insertion into said tubular member, projection means for projecting a beam of radiant energy through said window to illuminate an axial extending strip of the entire interior circumference of said tubular member and means arranged to correlate reflected energy from the window with reflected energy from the interior circumference of the tubular member for determining damage of said tubular interior surface. The damage may be for example ovality or corrosion.

Preferably means are provided for centralising said body within said tubular member and advantageously the projection means includes a rotatable reflective means.

The present inspection eliminates the requirement for twin lasers and cameras, line forming optics, a number of the reflectives used in the forementioned U.S.A. patent and requires reduced power consumption, allowing the manufacture of a smaller apparatus without loss of capability. In a preferred embodiment this is achieved by locating an energy source directly to the rear of a single camera, using surface coated angular reflectives and adopting angles of incidence to project the radiant energy beam to an axially central rotating, angled, reflective forward of the camera or other receptor system. The rotating reflective is conveniently provided with an independent power source and provides no restriction to reception of energy reflected from the tubular member internal circumference. The replacement of the angled reflectives by fibre optic cable between the energy source and the rotating reflective is contemplated for certain applications to reduce interference at the receptor and signal output areas, in addition to reducing heat transfer.

In this invention a novel use is used for the phenomenon of reflective energy from its passage through the window to form a perfect ring which acts as a master for comparison with the reflected ring of light from the internal circumference of the tubular member.

In a feature of this invention it is an object to provide the ability to inspect a tubular member internal surface even though said tubular member contains fluid.

Where the inspection apparatus is to be used in a tubular member containing fluid, according to a feature of this invention an inspection apparatus adapted to provide means for illuminating an axial extending strip of the entire internal circumference of the tubular member includes cleaning means for cleaning the outer surface of said window and means defining an expandable diaphragm located around said body which is capable of opening above, in operation, said window, and means for introducing a gas bubble over the exterior surface of said window and restrained by said diaphragm, whereby in operation the diaphragm is expanded to contact the interior circumference of said tubular member, a gas bubble is formed over said window and said window is cleaned by said wiper means prior to actuating the inspection apparatus to inspect the tubular member.

Advantageously the cleaning means comprises a reciprocal wiper means.

The feature of this invention ensures clear visibility from the inspection apparatus even in fluid-filled wells with some absorbency in event of surging.

For the explanation that follows, a laser has been considered as the energy beam source and a C.C.D. (Charge Coupled Device) or C.I.D. (Charge Injected Device) camera as the receptor, but other energy beam sources or receptors may be used in the non-visible range.

BRIEF DESCRIPTION OF THE DRAWINGS

The invention will now be described, by way of example, with reference to the accompanying drawings in which:

FIG. 1 shows an inspection apparatus in accordance with this invention in which the apparatus is attached by wire line to a well head, and in which

In the Figures like reference numerals denote like parts.

DESCRIPTION OF PREFERRED EMBODIMENTS

Figure 1A:
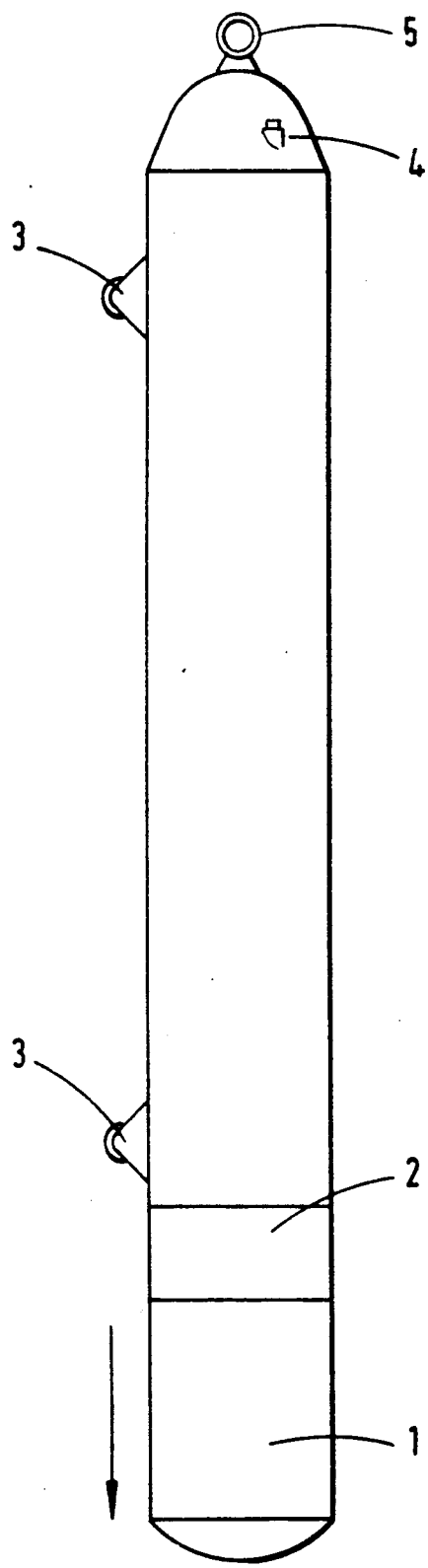
FIG. 1(a) shows the external parts of the device and FIG. 1(b) shows the internal devices within the apparatus.
Figure 1B:
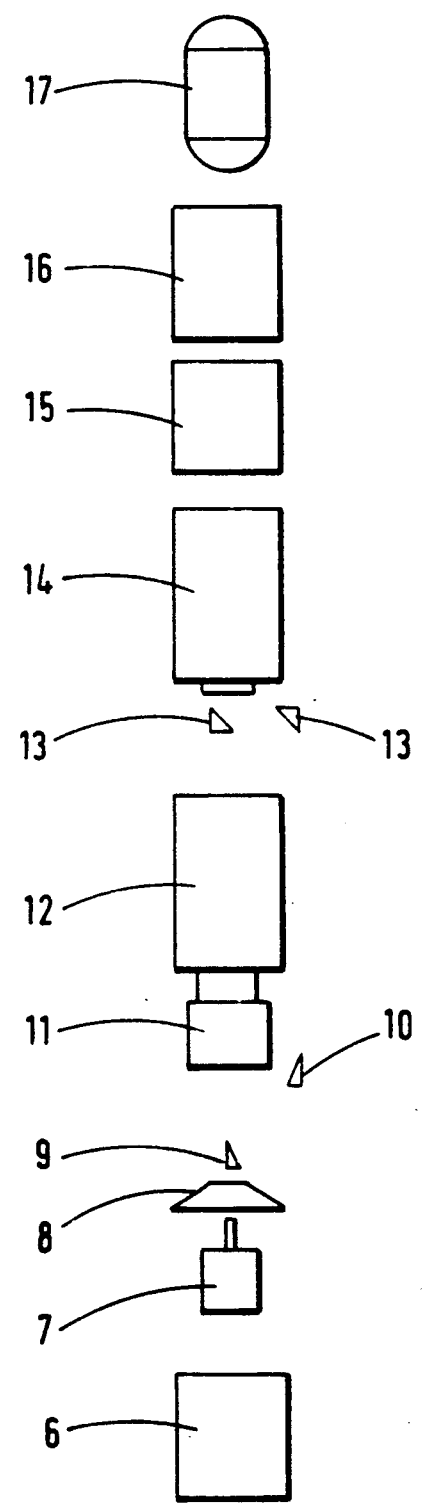

The apparatus shown in FIGS. 1(a) and 1(b) has a circularly cross-sectioned body 1, generally known as a pig, which is formed by an external case usually manufactured from pressure and temperature resistant alloy. Within the casing 1 is a viewing port or window 2 which is made from special pressure, temperature, and abrasive resistant clear material such as LEXAN, toughened glass or quartz. The window extends around the entire 360° circumference of the body.

Three equi-circumferentially spaced centralisers 3 are provided at the top and bottom of body 1, which are items normally used on pigs to ensure that the pig remains centrally located within a pipe bore during operation are located about the external circumference of the body 1. A sealed female connector 4 on the body 1 provides a connection for a wire line from a well head winch. The connectors 4 may alternatively be of a male type and these connectors are used to carry power and control signals. The power may be pneumatic or hydraulic as well as electrical and the wire line is used to carry signals to and from the body to the well head. An eye bolt 5 is provided to connect a cable for supporting the body and to control the descent and withdrawal of the body from the well head (not shown).

The internal parts of the body consist of a rechargeable battery pack 6 providing 6 V D.C. power (although it will be realised by those skilled in the art that other voltages, and for that matter forms of power, may be provided) and the battery pack is located in the nose cone of the body, forward of the viewing window 2. A 6 V D.C. high speed controlled rotation motor 7 has an output shaft on which is provided a nylon or self-lubricating bush that permits the shaft to rotate within an axial hole of an angled, radial surface coated reflective 8. Mounted to rotate with the shaft of the motor is a surface coated angular reflective 9 which is arranged to receive and transmit an energy beam through the window onto an internal wall of a tubular member 100 to be inspected. A timer (not shown) may be associated with the motor 7 for permitting a time lapse between the pig being entered into a tubular member and inspection beginning, to thereby permit the body to reach the required well depth.

A presenter reflective 10 is aligned so that an energy spot received by reflective 10 strikes the centre point of the spinning reflective 9. Alternatively, the presenter reflective 10 may be replaced by a fibre optic.

A remote control focussing lens assembly 11 for camera 12 is provided so that the camera may view a reflection ring, provided in operation, on the internal circumferential wall of the tubular member being inspected, the reflection from the viewing port 2 being described later herein. The camera 12 is, preferably, a solid-state type such as CCD or CID and provided with a pixel array for receiving a displayed image.

Figure 6:
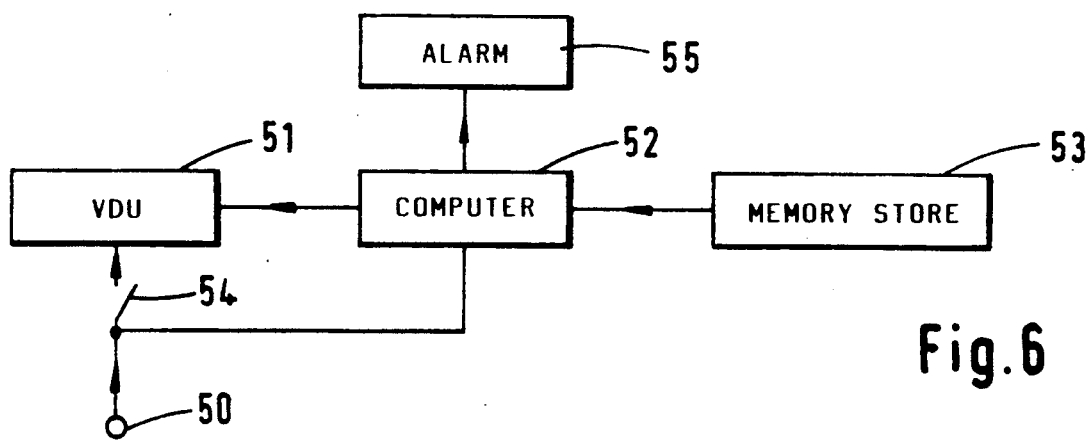

Two surface coated 45° angled reflectives 13 transfer an energy spot from a helium neon laser 14 having a telescopic lens reducer downwardly then laterally to presenter reflective 10. The path of the light beam energy is explained later herein with reference to FIG. 2. Instead of utilising reflectives 10 and 13 a fibre optic cable may alternatively be employed. The laser 14 is controlled by a solid state control circuit 15 receiving power input from the wire line (not shown) and distributing the power to the remote focussing lens assembly 11, the camera 12, the laser 14 and a signal transmission circuit 16 and a pressure vessel 17. The signal transmission circuit 16 is arranged to receive signals from the camera and to convert them and amplify the converter signals for transmission via the wire line to a well head receptor (shown in FIG. 6). The pressure vessel 17 in the preferred embodiment carries inert gas and can provide pneumatic power to provide a viewing bubble at the viewing port and to operate a cam/wiper, the purpose of which will be fully explained later herein with reference to FIGS. 4(a), 4(b) and 5, and it is to be understood that the pressure vessel 17 is not required if the apparatus is used in a dry well.

The apparatus for projecting an axial extending strip of light onto the entire interior circumference of the tubular member will now be described with reference to FIG. 2. The path of the energy beam from, in the preferred embodiment, a laser 14, is directed via the fixed reflectives 13 and 10 to the rotating reflective 9; the beam from the laser 14 being reflected downwards at 90° by the periscope reflectives 13 then onto angled reflective 10. The reflective 10 reflects the energy beam onto the centre of rotating reflective 9 which is being rotated at high speed by the motor 7. The reflective 10 reflects the beam outwards from the centre, describing a ring on the window 2 and outward through the window to describe a ring on the internal circumference of the tubular member being inspected. The centre point, i.e. a point on the axis of rotation of reflective 9 is denoted by A, the ring reflected from the viewing window 2 is denoted by B and the ring reflected from the internal circumference of the tubular member being inspected is denoted by C.

At this juncture it should be made clear that although a laser is preferred as the radiant energy producing means, it is, however, envisaged that other forms of radiant energy ray, in certain circumstances, be found desirable.

Figure 2:
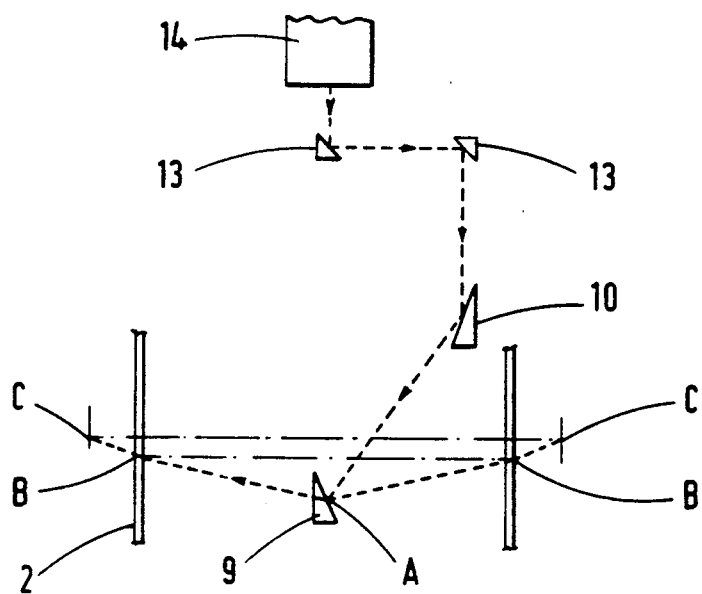
FIG. 2 show the radiant energy beam forming apparatus used in the apparatus of FIG. 1.
Figure 3:
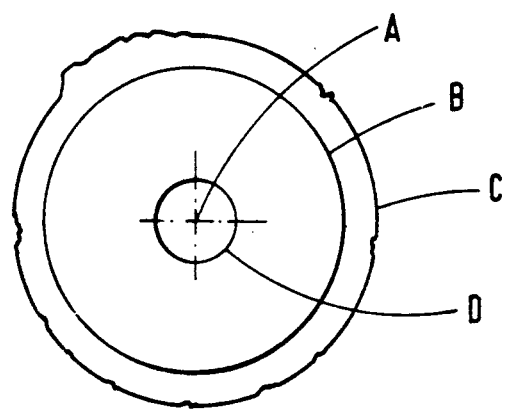
FIG. 3 shows the reflected information received by a camera.

The reflected detail from the window 2 and the internal circumference of the member being inspected is viewed and reflected by reflective 8 into the lens of the camera 12, the point A and rings B and C being the rings referred to above with reference to FIG. 2. The outer diameter described by reflective 9 as it rotates is denoted by D. Because there is beam deflection in passing through the wall of the window, the angle of throw changes slightly from the angle of incidence out of reflective 9 and the representation shown in FIG. 3 illustrates what would be seen on a well head monitor 51. In this respect when a spot of concentrated light or visible or non-visible energy passes through glass or other clear medium, the majority of the energy does pass through but the surface of the glass, etc. reflects back a portion of energy. Also, the glass, or clear medium, slightly distorts the energy path leaving it, so if this energy is in the visible range two separate spots or rings will be discerned and in the case where very thick glass, quartz, etc., is used, more rings may be noted. The rings reflected by the beam outward path are significant because these will always form true rings to the centre of the body because the spinning reflective 9 is arranged to spin centrally, i.e. axially with respect to the viewing window so the distance centre to the window wall is constant providing a perfect circle when viewed by the camera.

The operation of the apparatus shown in FIGS. 1(a) and 1(b) and 2 will now be described and it is presumed that the apparatus is to be used in a dry tubular member, i.e. a tubular member in which fluid such as liquid is absent. A wire line is secured to connector 4 and a cable connected to eye bolt 5, power is fed to the body and the control operation is checked, the lens focus is checked if remote control is set and locked, and if autofocus is to be used then this is checked for appropriate function. The motorised reflective rotation and laser operation are checked and the well head monitor is checked for ring reflection definition. The motorised reflective timer is set to a required time lapse and the body is entered into a tubular member to be inspected and lowered to the required position or bottom of the well.

From the surface controller, power is fed to the control circuit 15 via the wire line, the timer for the reflective drive motor 7 permits power to the motor after effluction of the preset time and reflective 9 rotates up to operational speed. The laser 14 and the camera 12 are now switched on as is the well head located monitor for receiving signals transmitted from transmission circuit 16. The monitor will show two rings as shown in FIG. 3, the outer ring C denoting the energy reflected from the tubular member internal wall and the ring B denoting the inner specular reflection from the viewing window 2.

Provided that the inner circumference of the tubular member being inspected is not damaged by, for example, working tools or corrosive action, or is not truly circular in cross-section due to internal pressure or ovality or reeding and there is no build up of scale or wax etc., then the reflection from the tubular member in a circumference C should be concentric with the inner viewed ring B providing that the centralisers 3 are maintaining the body concentrically within the tubular member. However, even if the centralisers 3 are not maintaining the body coaxially with the tubular member being inspected, the axial centre of the body and the inner ring relationship is a known dimension from which computer software can be used to accurately detect out of round or damage conditions.

The axially extending illuminated strip on the inner circumference wall of the tubular member being inspected and from the window that is produced by the laser 14 is reflected to the camera 14 by the angled reflective 8 which reflective 8, activates, according to light strength, the pixels in the camera array. The pixel activity is rapidly read at 25 frames per second or more then transmitted via circuit 16 to a well head monitor 51 (shown in FIG. 6) which displays the images shown in FIG. 3.

The circuit at the well head includes a terminal 50 for receiving data transmitted from the pig which is transferred via a switch 54 to a VDU monitor 51 and/or to a computer 52. The computer has a memory store 53 of predetermined data and is connected to the monitor 51 and to operate a visual or audible alarm 55.

Each group of pixel activities forming a picture on being transmitted up the wire line can be handled in various ways, for example a video picture could be reformatted and put on video tape or disk, at the same time putting the signals in groups into the computer memory store 53 then by applying suitable software comparisons may be made with other data held in memory corresponding to tubular diameters and allowable tolerances. A comparative analysis process is effected whereby if there is no recognisable deformation, damage or restrictions, and there is no secondary action from the computer. If on the other hand, there is no direct match or outside tolerance variation is detected, there is secondary action which could take numerous forms; for example if incoming memory data does not correspond with resident, predetermined memory data, then an automatic alarm 55 sequence can be provided which stops the cable winch lifting the body and provides an audible and visual alarm signal to an operator. The monitor could, only at that tire, be activated and the computer instructed by menu programme to return the body to, say, 2 feet (61 cm) below the error indication point, then slowly traverse the area with the body and constantly view the traversed area with the monitor, or at predetermined steps of desired distance, and utilise the computer to provide graphic or other type error readings. Such re-running can be repeated a number of times or recorded, or actioned in any manner required by the operator or the field supervisor or as may be directed by production company staff.

By the use of the above described apparatus, smaller diameter tubular members may be inspected without loss of function or capability over the apparatus described in U.S. Pat. No. 4,800,104 in that with the present invention diameters up to about 18 inches (45.7 cm) may be inspected whereas in the said U.S.A. patent only tubulars over about 30 inches (76 cm) could be inspected.

As described above, the pressure vessel 17 may be used for carrying inert gas but the vessel 17 is only used where the body is required to operate in a tubular member containing fluid such as liquid. In a feature of this invention, tubular members containing fluids of various types may be inspected. Certain types of low concentrate saline solutions found in wells can be adquately inspected with the apparatus described in the prior art reference U.S. Pat. No. 4,800,104, but upper well fluids could, possibly, not be inspected. The apparatus now disclosed is intended to provide a satisfactory means for inspection irrespective of which type of fluid is present in the tubular member and this object is achieved by creating a clear inert gas bubble which eliminates fluid between the body viewing window and the tubular member internal wall.

There are a number of ways in which such a bubble may be formed, for example, inert gas can be fed to an expandable bladder which is then pressurised to ride on the tubular wall to act as a seal, then inert gas may be fed under the seal to create a fluid-free bubble around the viewing port, the inert gas being fed from either a pressure vessel on the pig or by tubing line from the well head.

Figure 4A:
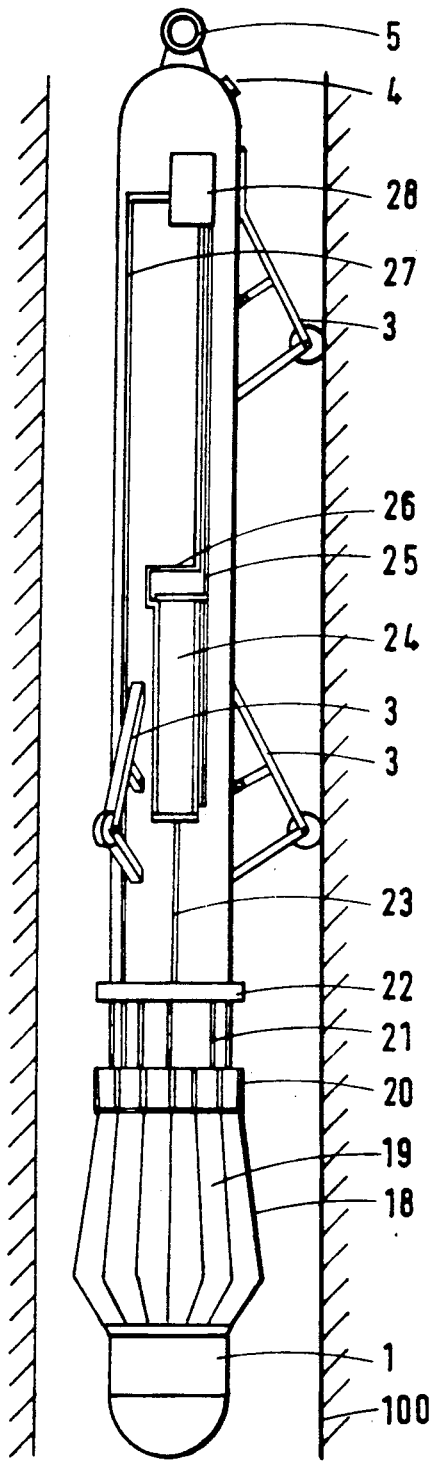
FIG. 4 shows the apparatus adapted for use in a fluid containing tubular member, FIG. 4(a) showing the apparatus in one mode of operation for lowering into a member and FIG. 4(b) showing the apparatus in another mode of operation for scanning the member with the centralisers omitted for clarity.
Figure 4B:
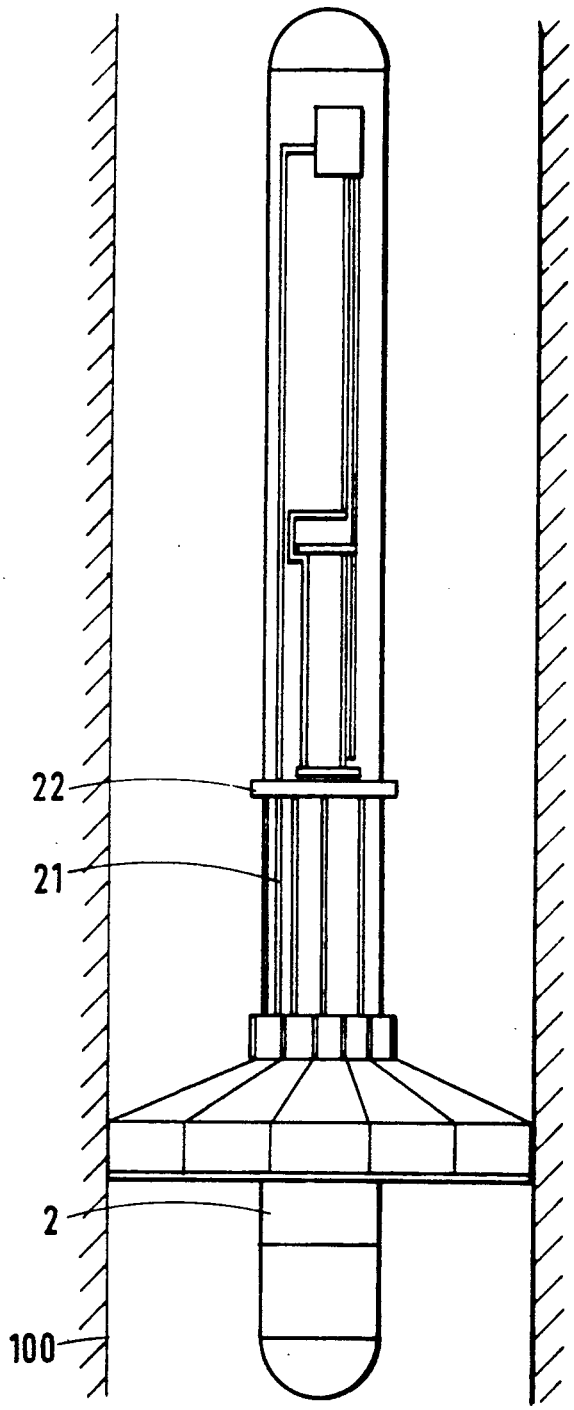

Referring to FIG. 4(a), the apparatus is shown in the configuration it would adopt when entering a tubular member and FIG. 4(b) shows the configuration the apparatus would adopt when being raised from a tubular member. The apparatus is generally the same as that described above with reference to FIGS. 1–3 and only the additional integers will be described. A plurality of wire spring fingers 18 are pivotally and equi-circumferentially disposed about the body 1 and support a circumferential membrane 19, the upper end of the spring fingers 18, as well as an upper end of the membrane 19 being attached to a support ring 20 which is secured to the body 1 above the window 2. A plurality of axially extending and circumferentially disposed shafts 21 are located about the body 1 above the ring 20 and the shafts are attached to an opening cam/wiper 29 (shown in FIG. 5) which is located between the membrane 19 and spring fingers 18 and the body 1. The opposite ends of the shafts 21 are fixedly secured to a ring 22 which is capable of sliding movement axially along the body 1 and the ring 22 is attached to rams 23 of two pneumatic, alternatively, hydraulic, cylinders 24 mounted on the body 1. A power feed pipe 25 is connected to the front of cylinder 24 so that pressure in the feed pipe 25 is able to force the piston within the cylinder upwardly to thereby rove piston 23 and hence ring 22 and shafts 21 upwardly (as viewed in FIGS. 4(a) and 4(b)).

Figure 5:
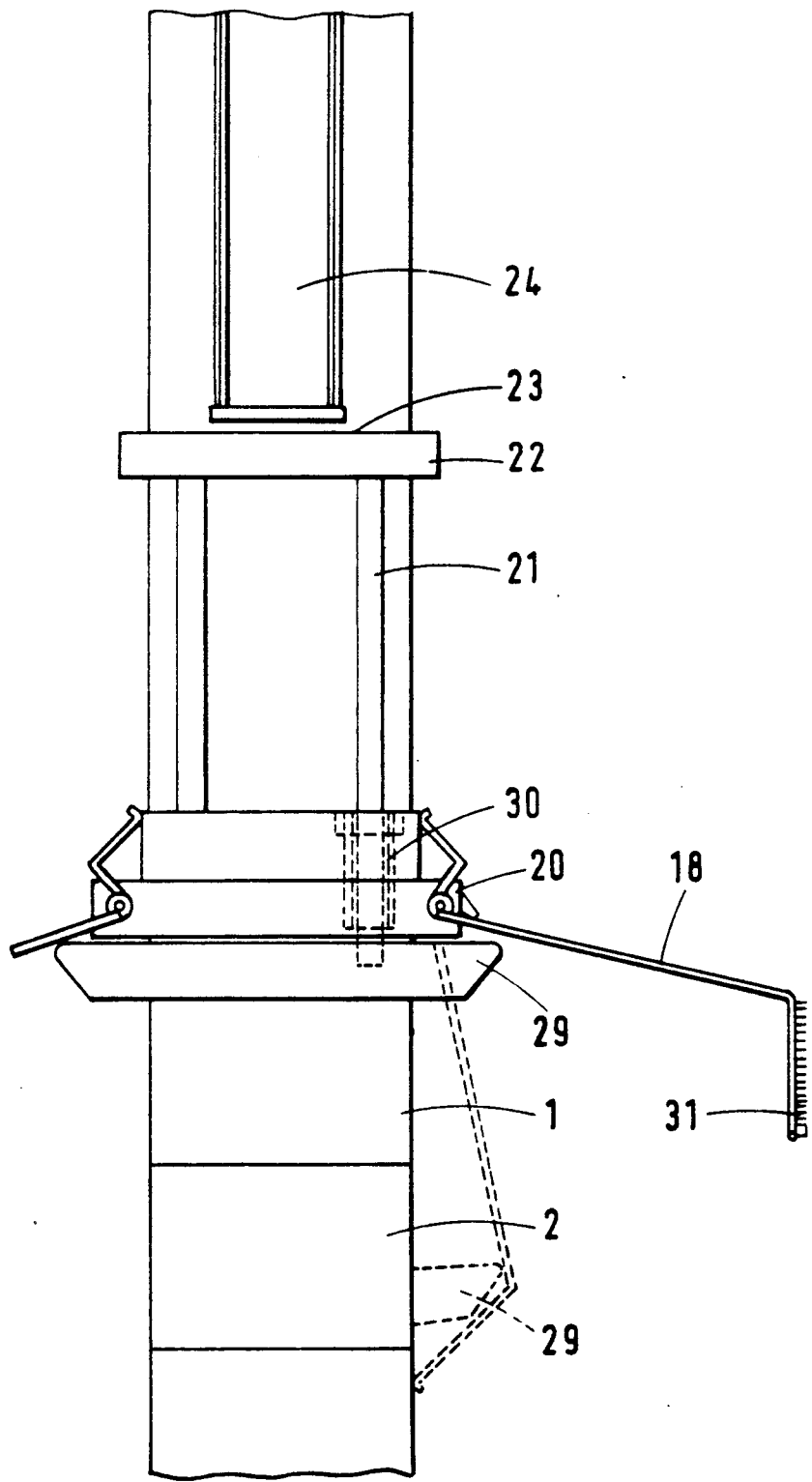
FIG. 5 shows an enlarged detail of part of the apparatus shown in FIGS. 4a and 4b and, FIG. 6 shows a block schematic diagram of the well head monitoring and correllating devices.

An inert gas feed pipe 27 passes along the length of the body to pass under rings 22 and 20 and under the membrane 19. A control box 28 for activation of cylinder 24 and gas through pipe 27 is provided at the top end of the body 1. The FIG. 5 shows in greater detail how the membrane 19 is expanded. In this respect, the cam rise ring 29 having a torroidal cross-section is located about the body 1 and window 2. The ring 29 has, on the radial inside surface thereof, a strip of static-resistant, flexible wiper blade rubber or artificial hair material which acts as a wiper for the viewing window 2. The ring 29 is connected to shafts 21 to be axially movable with ram 23, ring 22 and shafts 21. The shafts 21 pass through the gland bushes 30 for permitting the shafts 21 to move axially without entry of liquids and with minimal loss of inert gas that is in operation produced beneath the membrane 19. A tough flexible seal strip 31 is located on the lower outermost radial portion of the fingers 18 when expanded so as to abrade the tubular member internal wall and to form an effective precious seal between the membrane and the inner tubular wall.

In operation, the apparatus in the configuration shown in FIG. 4(a) is lowered by cable to the desired depth in the well. A wire line is used which ray be a coiled tube type capable of carrying pressurised inert gas to the body from the well head or, alternatively, it may carry hydraulic pressure or, in another alternative, two independent wire lines, one of armoured tube for pneumatics or hydraulics and the other for electrical power and signals may be provided. The membrane closed position of the spring fingers 18 and ring 29 is shown by broken lines in FIG. 5. When at a desired depth the control 28 is activated to raise the piston within cylinder 24 which thereby lifts ram 23, ring 22, shafts 21 and cam/wiper ring 29. The ring 29 when lowered into the well is positioned downhole with respect to the window 2. Upon raising the ring 29 so the window is cleaned by the material on the inner surface of the ring as the ring is raised and inert gas is then fed via feed tube 27 into the underside of membrane 19. As the gas pressure is increased, any other liquid or solution is pressed downwards away from the membrane. Limit stops, not shown, in support ring 20 prevent the fingers 18 from folding upwardly, as does the weight of the membrane, although the limit stops are intended as a safety feature since the action of sealing the membrane against the internal circumference of the tubular member to be inspected by the seal strip 31 should, in normal circumstances, limit the upward, opening, extent of the membrane and fingers 18. Once the membrane is fully open and sealed against the inside circumference of the tubular member to be inspected, the ring 29 may be reactivated to return downwardly, again wiping the window 2. The gas bubble is arranged to cover the window 2 so that the energy beam has a clear passage from the window 2 to the interior surface of the tubular member back through the window onto the camera pixel array. The camera and other systems are now operated and the body is winched upwardly for inspection of the internal circumference of the tubular member to commence as described hereinbefore. Because the gas bubble is capable of compression, any tendency for surging within the well will compress the bubble and any tendency for the body to lose regular withdrawal speed is reduced unlike a prior art calliper which has no shock absorbency.

Because there may be a column of liquid above the body and bubble which is, of course, non-compressible, a bleed for that liquid must be provided at the well head. The bleed rate requires to be calculated relative to the speed of the body and rate of inspection required, the type of liquid being displaced and a balance with any upward pressure from the well. As the body approaches the well head so the bubble will enlarge due to pressure decrease, thereby further acting as an absorber for well surges. As the well head is approached, a relief valve (not shown) in control 28 is activated allowing the inert gas to pass from below the membrane 19 to above it, the cam/wiper ring 29 is moved to position over the viewing window 2 and the spring wire fingers then being free of gas pressure close the membrane 19 to facilitate withdrawal.

In a device capable of running in both dry or fluid filled tubular members, members 18-24 are removable and plugs made available for members 25-27 to enable the body to run with or without the gas bubble formation capability.

Although the invention has been described by way of currently preferred embodiments, numerous alternatives within the spirit and scope of the invention will be evident to those skilled in the art and the invention is intended to be limited only by the appended claims.

I claim:

1. An inspection apparatus for internally inspecting a tubular member, said apparatus including a body having an inspection window, means for locating said body in said tubular member, means for projecting a light beam through said window to illuminate an axial extending strip of the entire interior circumference of the tubular member, means for receiving energy reflected by said window and from the interior surface of the tubular member and means for correlating said energy reflected from the window with reflected energy from the interior surface of the tubular member for determining damage of said tubular member interior surface.

2. An inspection apparatus as claimed in claim 1 wherein the projection means includes a light energy source arranged to direct a beam onto a rotatable reflective member which reflective member is arranged to illuminate the entire 360° internal circumference of the tubular member (100) being inspected.

3. An inspection apparatus as claimed in claim 2 wherein the light beam from the source is spaced from the rotatable reflective by the intermediary of a camera means and the light beam from the source is transmittable around the camera means by an arrangement of light beam reflectives onto the rotatable reflective member.

4. An inspection apparatus as claimed in claim 2 wherein the rotatable reflective member is arranged to be driven by a motor.

5. An apparatus as claimed in claim 4 wherein radiant energy reflected from the window and the interior surface of the tubular member to be inspected is arranged to be focussed at the camera means.

6. An inspection apparatus claimed in claim 1 wherein the correlation means includes a computer having a memory store in which is located predetermined data and said computer is arranged to compare the received reflected energy and to provide an output signal indicative of said comparison.

7. An inspection apparatus as claimed in claim 6 wherein when the computer determines that damage has occurred to the tubular member being inspected then said computer activates an alarm.

8. An inspection apparatus as claimed in claim 1 wherein means are provided for centralising said body within said tubular member.

9. An inspection apparatus as claimed in claim 1 wherein cleaning means are provided for cleaning the outer surface of the window and means for defining an expandable diaphragm are located around said body, said expandable diaphragm being capable of opening above said window and means being provided for introducing a gas bubble over the exterior surface of said window, which gas bubble may be restrained by said diaphragm, whereby, in operation, the diaphragm is expanded to contact the interior surface of said tubular member, a gas bubble is formed over said window and said window is cleaned by said wiper means prior to actuating the projection means and the correlation means.

10. An inspection apparatus as claimed in claim 9 wherein the cleaning means comprises a reciprocal wiper means.

11. An apparatus as claimed in claim 10 wherein the wiper means is actuable by a hydraulic or pneumatically drivable ram means and said wiper means is adapted to open said expandable diaphragm.

12. An inspection apparatus as claimed in claim 11 wherein the expandable diaphragm is mounted on pivotable spring fingers, said spring fingers being arranged to be opened and closed by said reciprocal wiper means and said spring fingers being circumferentially disposed about said window said spring fingers having a radially outer portion thereof provided with sealing means adapted to engage with a 360° circumference of the tubular member to be inspected.

13. An inspection apparatus for internally inspecting a tubular member, said apparatus including a body having an inspection window, means for locating said body in said tubular member, means for projecting a light beam through said window to illuminate an axial extending strip of the entire interior circumference of the tubular member, means for receiving energy reflected by said window and from the interior surface of the tubular member, and means for correlating said energy reflected from the window with reflected energy from the interior surface of the tubular member for determining damage of said tubular member interior surface, said correlation means comprising a computer having a memory store in which is located predetermined data, said computer being arranged to compare the received reflected energy and to provide an output signal indicative of said comparison.

14. An inspection apparatus for internally inspecting a tubular member, said apparatus including a body having an inspection window, means for locating said body in said tubular member, means for projecting a light beam through said window to illuminate an axial extending strip of the entire interior surface of the tubular member, means for receiving energy reflected by said window and from the interior surface of the tubular member, means for correlating said energy reflected from the window with reflected energy from the interior surface of the tubular member for determining damage of said tubular member interior surface, cleaning means for cleaning the outer surface of the window, means defining an expandable diaphragm located around said body, said expandable diaphragm being capable of opening above said window, and means for introducing a gas bubble over the exterior surface of said window whereby the diaphragm is expanded to contact the interior surface of said tubular member, said gas bubble is formed over said window and restrained by said diaphragm, and said window is cleaned by said wiper means prior to actuating the projection means and the correlation means.

* * * * *